(12) United States Patent
Lee et al.

(10) Patent No.: US 10,518,974 B2
(45) Date of Patent: Dec. 31, 2019

(54) AUTOMATED WAREHOUSE STORAGE AND RETRIEVAL SYSTEM

(71) Applicants: Yi-Lung Lee, Taichung (TW);
Tsair-Rong Chen, Changhua (TW);
Yi-Chun Lin, Changhua (TW);
Shu-Ming Chen, Taichung (TW)

(72) Inventors: Yi-Lung Lee, Taichung (TW);
Tsair-Rong Chen, Changhua (TW);
Yi-Chun Lin, Changhua (TW);
Shu-Ming Chen, Taichung (TW)

(73) Assignees: Tera Autotech Corporation, Taichung;
Dept. of Electrical Engineering, National Changhua University of Education, Changhua (*) Notice: Subject to any disclaimer, the term of this patent is extended or adjusted under 35 U.S.C. 154(b) by 0 days.

(21) Appl. No.: 15/987,821

(22) Filed: May 23, 2018

(65) Prior Publication Data
US 2019/0359423 A1  Nov. 28, 2019

(51) Int. Cl.
*B65G 1/137* (2006.01)

(52) U.S. Cl.
CPC .................. *B65G 1/1375* (2013.01)

(58) Field of Classification Search
CPC .................................................. B65G 1/1375
See application file for complete search history.

(56) References Cited

U.S. PATENT DOCUMENTS

| | | | | |
|---|---|---|---|---|
| 5,540,532 A * | 7/1996 | Carder | ................. | B65G 1/0407 414/279 |
| 6,824,345 B2 * | 11/2004 | Hansl | ................... | B65G 1/0407 198/347.2 |
| 9,731,896 B2 * | 8/2017 | Elazary | ................. | B25J 19/023 |
| 2010/0316470 A1 * | 12/2010 | Lert | ....................... | B65G 1/045 414/273 |
| 2013/0151004 A1 * | 6/2013 | Winter | ..................... | G01N 1/42 700/218 |

* cited by examiner

*Primary Examiner* — Kyle O Logan
(74) *Attorney, Agent, or Firm* — Che-Yang Chen; Law Offices at Scott Warmuth (57) ABSTRACT

An automated warehouse storage and retrieval system may comprise at least an aisle, and each of two sides of the aisle has a shelf. A rail is laid along the aisle to enable at least an automated vehicle to move thereon. The automated vehicle has a platform, and a top surface thereof comprises at least a working station and at least a pick-and-place unit. Each of two lateral sides of the platform has two openings separated by a desired distance, and each of the openings has a climbing unit installed therein. The climbing units are configured to synchronously protrude from or move back in the openings. A side of the shelf faced to the rail has a plurality of vertical supporting members arranged in parallel, and each two adjacent supporting members are separated by the distance same as the two climbing units on the same lateral side of the platform.

10 Claims, 14 Drawing Sheets

AUTOMATED WAREHOUSE STORAGE AND RETRIEVAL SYSTEM

FIELD OF THE INVENTION

The present invention relates to an automated warehouse storage and retrieval system and more particularly to an automated warehouse storage and retrieval system that enables a plurality of automated vehicles to work at the same aisle.

BACKGROUND OF THE INVENTION

Figure 1:
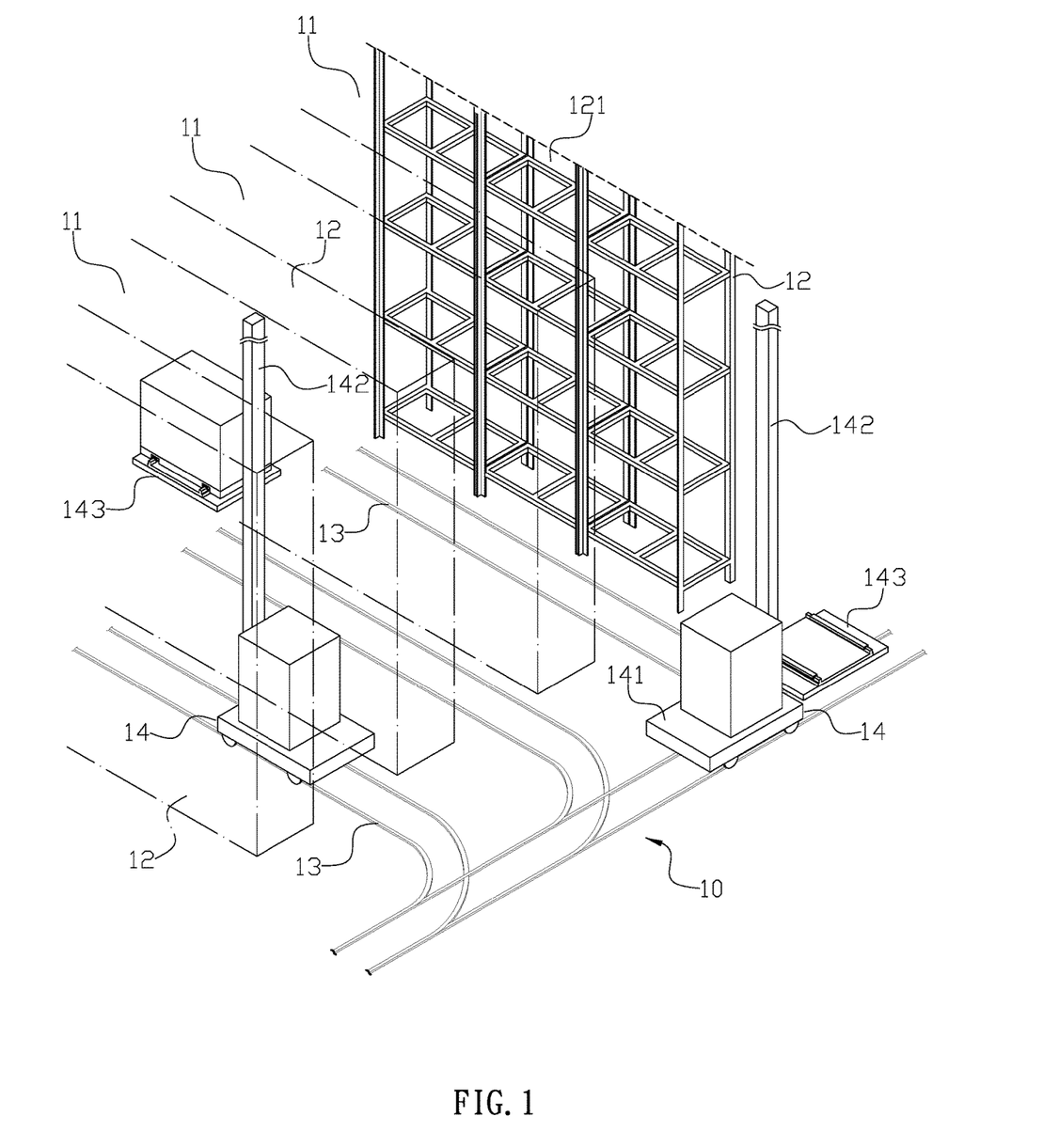
FIG. 1 is a prior art.
Figure 2:
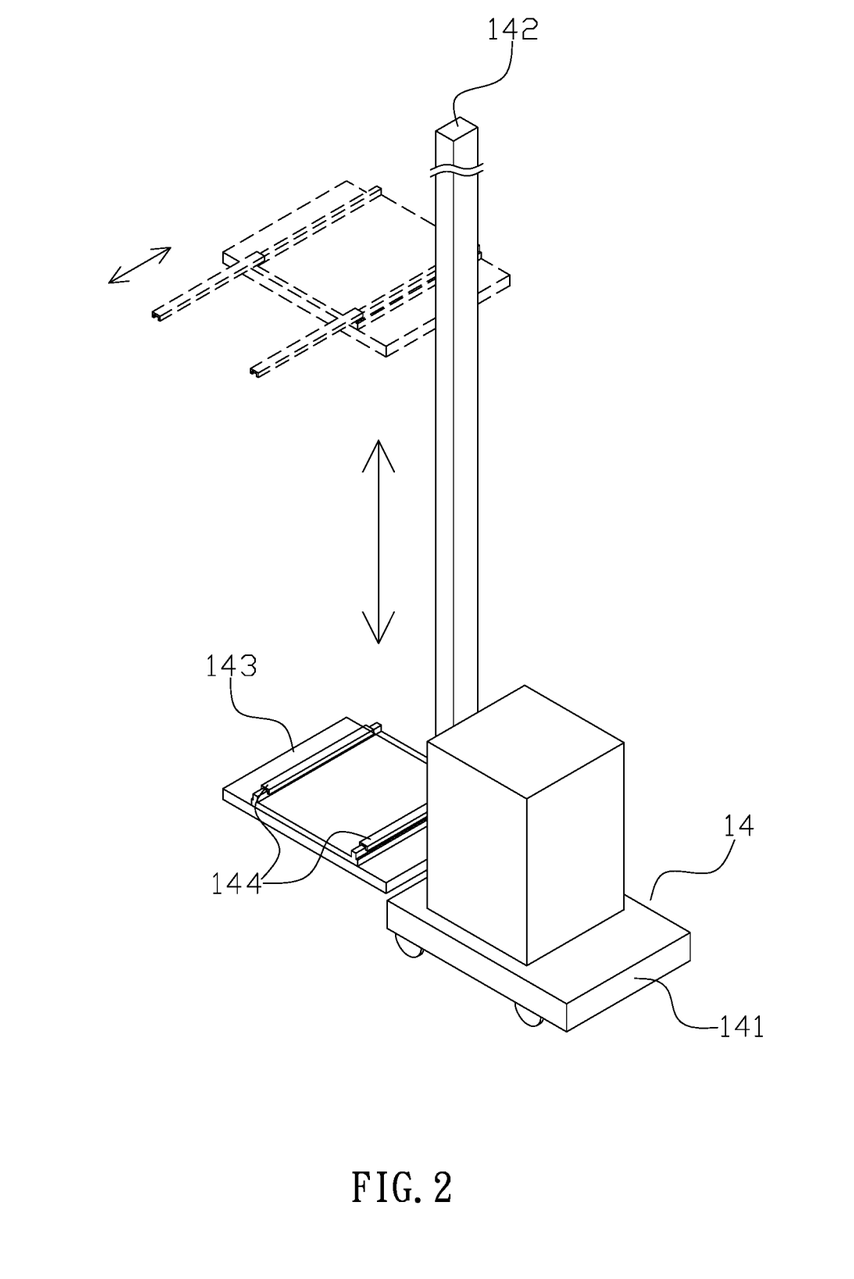
FIG. 2 is a prior art.
Figure 3:
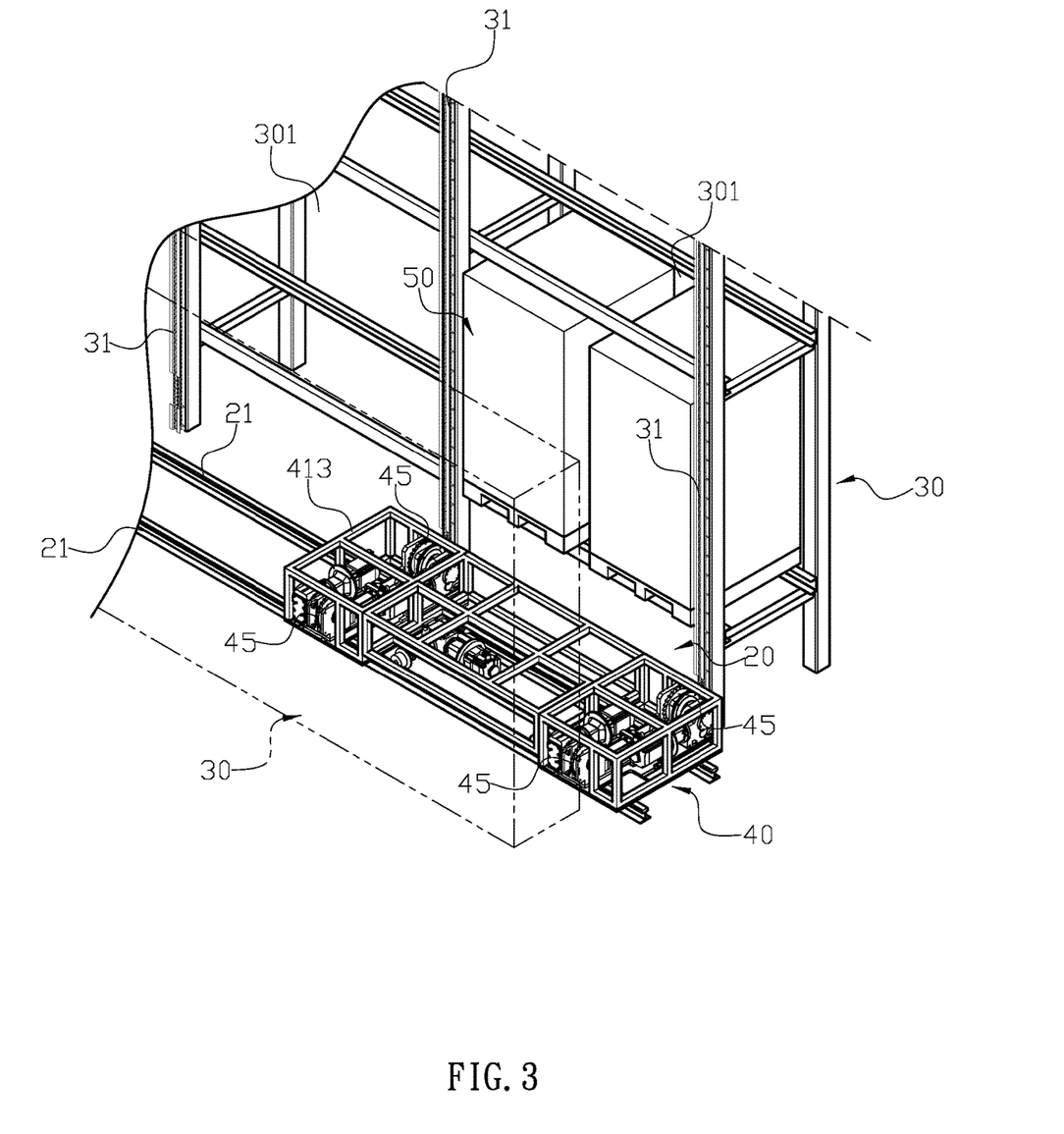
FIG. 3 is a three-dimensional assembly view illustrating an automated vehicle works between two shelves in an automated warehouse storage and retrieval system of the present invention.
Figure 4:
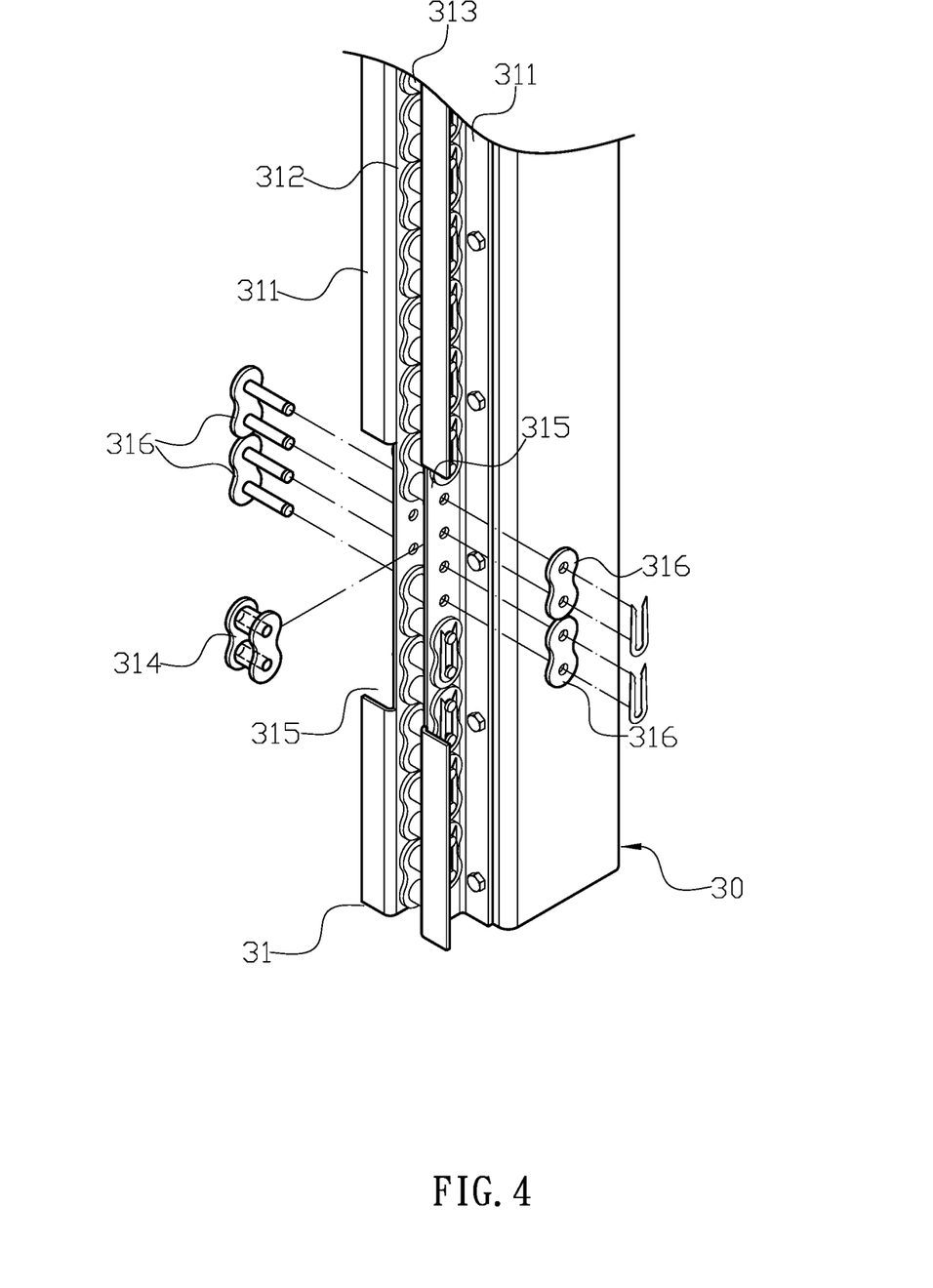
FIG. 4 is a detailed exploded view of a supporting member of the automated warehouse storage and retrieval system of the present invention.
Figure 5:
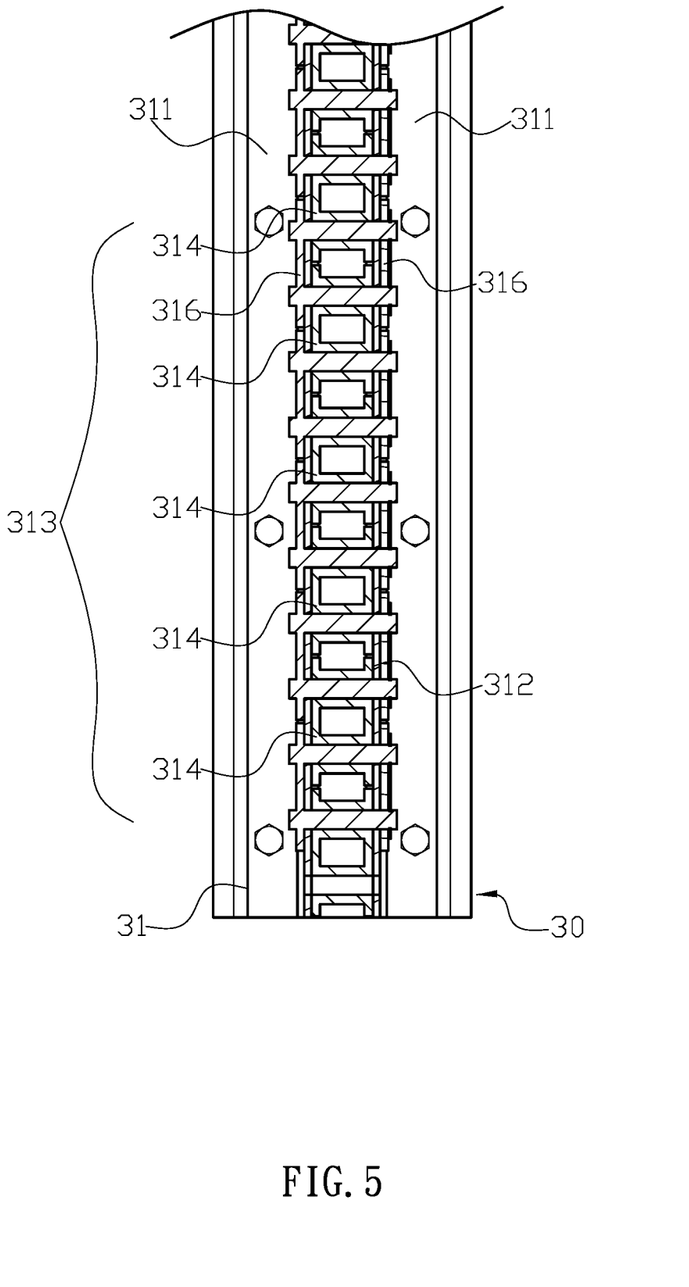
FIG. 5 is a partial enlarged assembly view of the supporting member of the automated warehouse storage and retrieval system of the present invention.

Referring to FIGS. 1 and 2, a conventional automated warehouse storage and retrieval system (10) comprises at least an aisle (11), and each of two sides of the aisle (11) has a plurality of storage shelves (12). Furthermore, the automated warehouse (10) has a rail (13) to enable an automated vehicle (14) to move thereon. In case that the automated warehouse (10) has a plurality of aisles (11), and the rails (13) are connected to enable the automated vehicle (14) to move between the aisles (11). In one embodiment, the automated vehicle (14) is a stacker comprising a base (141), an upright post (142), a working platform (143) and a pair of pallet forks (144). The upright post (142) is not lower than the height of the storage shelves (12), and the working platform (143) is configured to be raised or lowered along the upright post (142). Moreover, the pair of pallet forks (144) is adapted to be moved forward or backward to horizontally protrude from the working platform (143) or be retracted back on the working platform (143). In actual application, before stored in the warehouse, the goods are placed on a holding area, and through the rails (13) and the pallet forks (144), the automated vehicle (14) is configured to move the goods to designated storage spots (121) of the storage shelves (12) in the automated warehouse (10). Furthermore, the automated vehicle (14) also can move the goods stored on the shelves (12) out of the automated warehouse (10) for delivery of goods.

However, the conventional automated warehouse storage and retrieval system is disadvantageous because: (i) in order to pick or place goods on the shelves (12), the automated vehicle (14) needs to have the upright post (142) which is not lower than the height of the storage shelves (12), and in case that the system has two or more automated vehicles (14), because of the upright post (142), the aisle (11) cannot be shared by the automated vehicles (14), which makes the single aisle (11) can only be used by one automated vehicle (14), resulting in lowering the efficiency of goods handling; (ii) the long upright post (142) is not easy to be manufactured, maintained or secured on the base (141); and (iii) the automated vehicle (14) having many parts is bulky, which not only lowers the efficiency of goods handling but also costs more energy when operating. Therefore, there remains a need for a new and improved design for an automated warehouse storage and retrieval system to overcome the problems presented above.

SUMMARY OF THE INVENTION

The present invention provides an automated warehouse storage and retrieval system which comprises at least an aisle, and each of two sides of the aisle has a shelf. Moreover, a rail is laid along the aisle to enable at least an automated vehicle to move thereon. The automated vehicle has a platform, and a top surface of the platform comprises at least a working station and at least a pick-and-place unit thereon. Each of two lateral sides of the platform has two first openings which are separated by a desired distance, and each of the first openings has a climbing unit installed therein. Moreover, each of the climbing units is configured to be operated by a telescoping member to synchronously protrude from or move back in the first opening. Also, each of the climbing units is driven by a power unit to have forward or reverse rotation. A side of the shelf faced to the rail has a plurality of vertical supporting members which are arranged in parallel, and each two adjacent supporting members are separated by the distance same as the two climbing units on the same lateral side of the platform. The automated vehicle is configured to move on the rail to a designated position, and the climbing units are pushed out from the first openings by the telescoping members so as to respectively engage with the supporting members of the shelves at the two sides of the aisle. The climbing units are configured to upwardly or downwardly climb along the supporting members synchronously thereby raising the automated vehicle to a designated height or lowering the automated vehicle back to the rail. Each of the supporting members of the shelf has two vertical elongated guiding tracks, and each of the guiding tracks comprises an interior space and a vertical elongated opening to form the cross-section of the guiding track in a U-shape, and the two vertical elongated openings on the two guiding tracks are faced toward opposite directions. Furthermore, the two guiding tracks of the supporting member are separated by a designed distance, and a vertical lift groove is formed therebetween. Furthermore, each of the two guiding tracks has a plurality of chain links secured thereon to form a linear chain in the lift groove. In addition, each of the guiding tracks has a gap at a lower portion. Each of the climbing units has a base, and the base comprises a backboard and two side boards. Moreover, each of the two side boards has an auxiliary wheel pivotally installed on an inner surface of the side board, and a chain wheel is installed between the two side boards. Furthermore, each of the power units installed on either of the two side boards of the base of the climbing unit is connected to and drive the chain wheel. Additionally, each of the telescopic members is connected to the backboard of the climbing units such that each of the climbing units together with the power unit is adapted to be pushed out from or retracted back in the platform of the automated vehicle by the telescopic member.

Comparing with conventional automated warehouse storage and retrieval system, the present invention is advantageous because: (i) the present invention enables a plurality of automated vehicles to work at the same aisle, which improves the efficiency of warehouse works; (ii) without the upright post, the volume and weight of the automated vehicle are reduced, which enables the automated vehicle to work more efficiently thereby saving more energy; and (iii) the supporting members can be manufactured separately and be connected thereafter, which lowers the cost and is easy for maintenance.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 3 to 10, the present invention provides an automated warehouse storage and retrieval system which comprises at least an aisle (20), and each of two sides of the aisle (20) has a shelf (30). Moreover, a rail (21) is laid along the aisle (20) to enable at least an automated vehicle (40) to move thereon. The automated vehicle (40) has a platform (41), and a top surface of the platform (41) comprises at least a working station (411) and at least a pick-and-place unit (42) thereon. Each of two lateral sides of the platform (41) has two first openings (412) which are separated by a desired distance, and each of the first openings (412) has a climbing unit (45) installed therein. Moreover, each of the climbing units (45) is configured to be operated by a telescoping member (43) to synchronously protrude from or move back in the first opening (412). Also, each of the climbing units (45) is driven by a power unit (44) to have forward or reverse rotation. A side of the shelf (30) faced to the rail (21) has a plurality of vertical supporting members (31) which are arranged in parallel, and each two adjacent supporting members (31) are separated by the distance same as the two climbing units (45) on the same lateral side of the platform (41). The automated vehicle (40) is configured to move on the rail (21) to a designated position, and the climbing units (45) are pushed out from the first openings (412) by the telescoping members (43) so as to respectively engage with the supporting members (31) of the shelves (30) at the two sides of the aisle (20). The climbing units (45) are configured to upwardly or downwardly climb along the supporting members (31) synchronously thereby raising the automated vehicle (40) to a designated height or lowering the automated vehicle (40) back to the rail (21). Each of the supporting members (31) of the shelf (30) has two vertical elongated guiding tracks (311), and each of the guiding tracks (311) comprises an interior space and a vertical elongated opening to form the cross-section of the guiding track (311) in a U-shape, and the two vertical elongated openings on the two guiding tracks (311) are faced toward opposite directions. Furthermore, the two guiding tracks (311) of the supporting member (31) are separated by a designed distance, and a vertical lift groove (312) is formed therebetween. Furthermore, each of the two guiding tracks (311) has a plurality of chain links (314) secured thereon to form a linear chain (313) in the lift groove (312). In addition, each of the guiding tracks (311) has a gap (315) at a lower portion. Each of the climbing units (45) has a base (451), and the base (451) comprises a backboard (452) and two side boards (453). Moreover, each of the two side boards (453) has an auxiliary wheel (454) pivotally installed on an inner surface of the side board (453), and a chain wheel (455) is installed between the two side boards (453). Furthermore, each of the power units (44) installed on either of the two side boards (453) of the base (451) of the climbing unit (45) is connected to and drive the chain wheel (455). Additionally, each of the telescopic members (43) is connected to the backboard (452) of the climbing units (45) such that each of the climbing units (45) together with the power unit (44) is adapted to be pushed out from or retracted back in the platform (41) of the automated vehicle (40) by the telescopic member (43).

Figure 11:
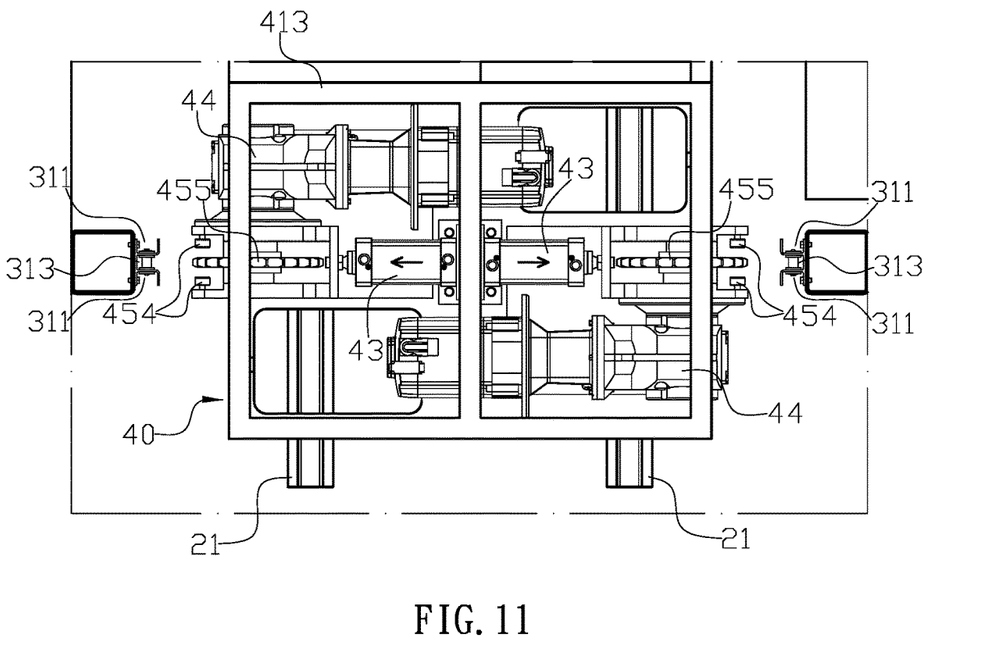
FIG. 11 is a schematic view illustrating telescopic members of the automated vehicle are extending to push climbing units respectively in the present invention.
Figure 12:
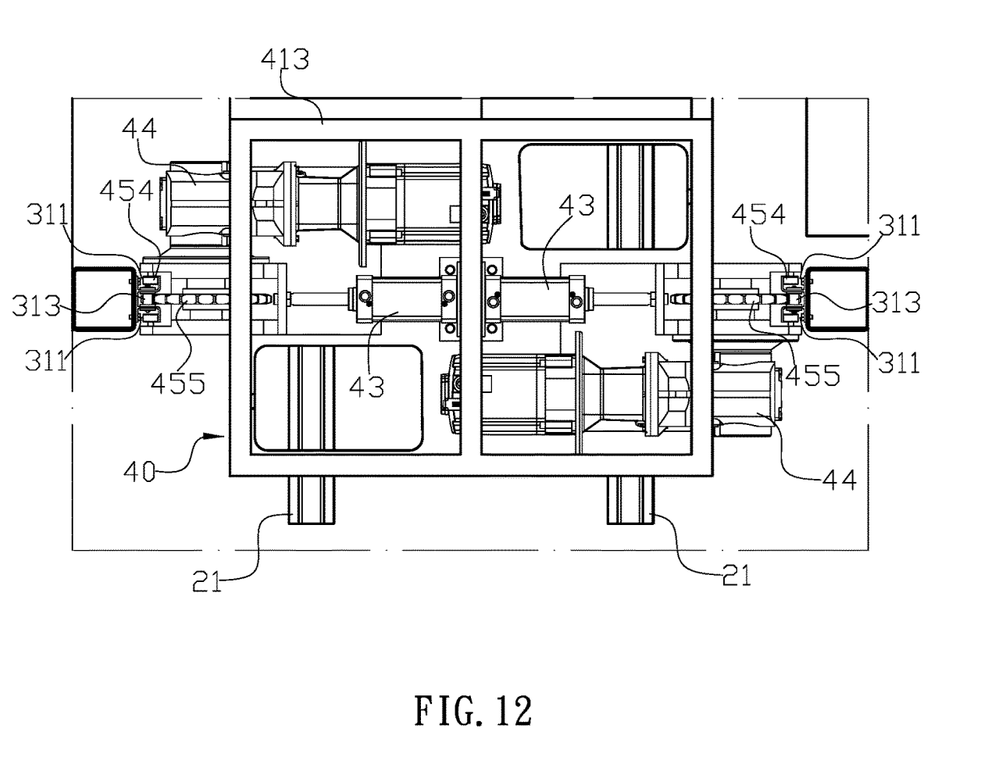
FIG. 12 is a schematic view illustrating the climbing units pushed by the telescopic members respectively engage with the supporting members in the present invention.
Figure 13:
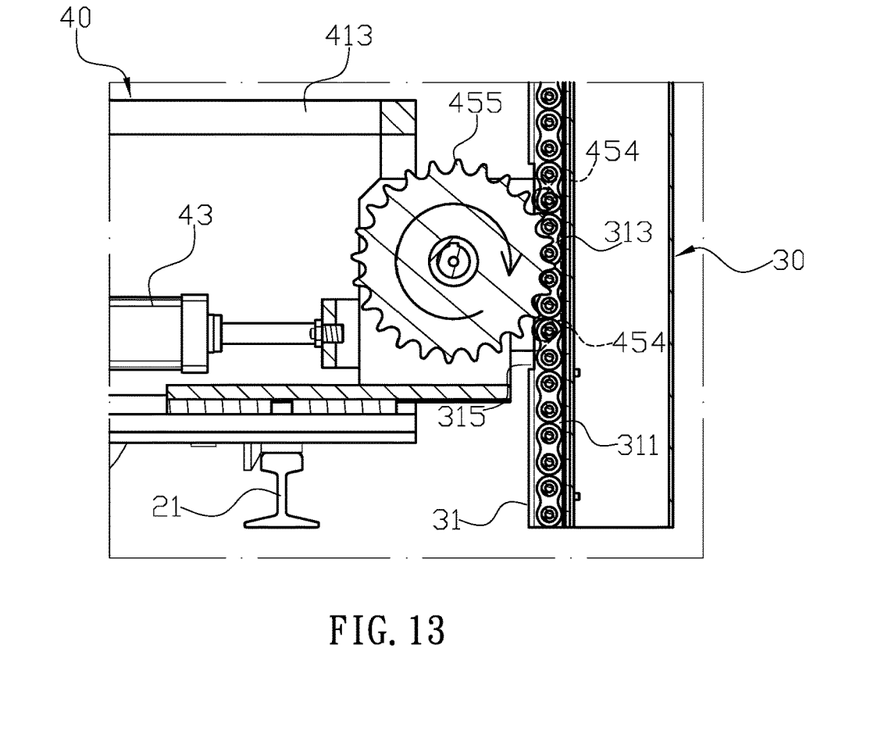
FIG. 13 is a schematic view illustrating a chain wheel of the climbing unit rotates in a forward direction.
Figure 14:
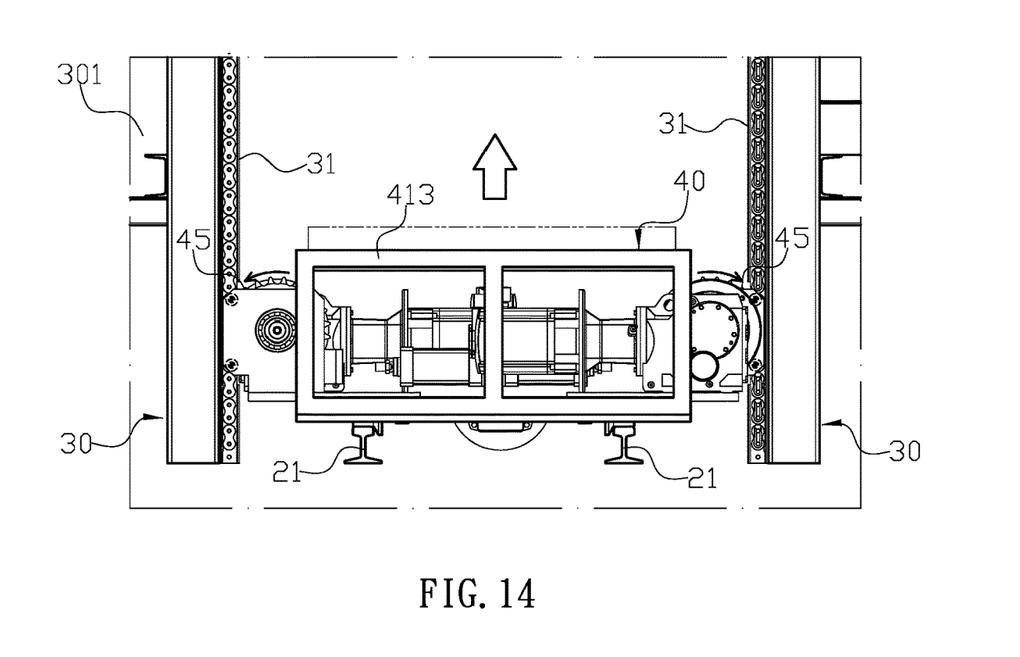
FIG. 14 is a schematic view illustrating the automated vehicle climbs upwardly when the chain wheels rotate in the forward direction.
Figure 15:
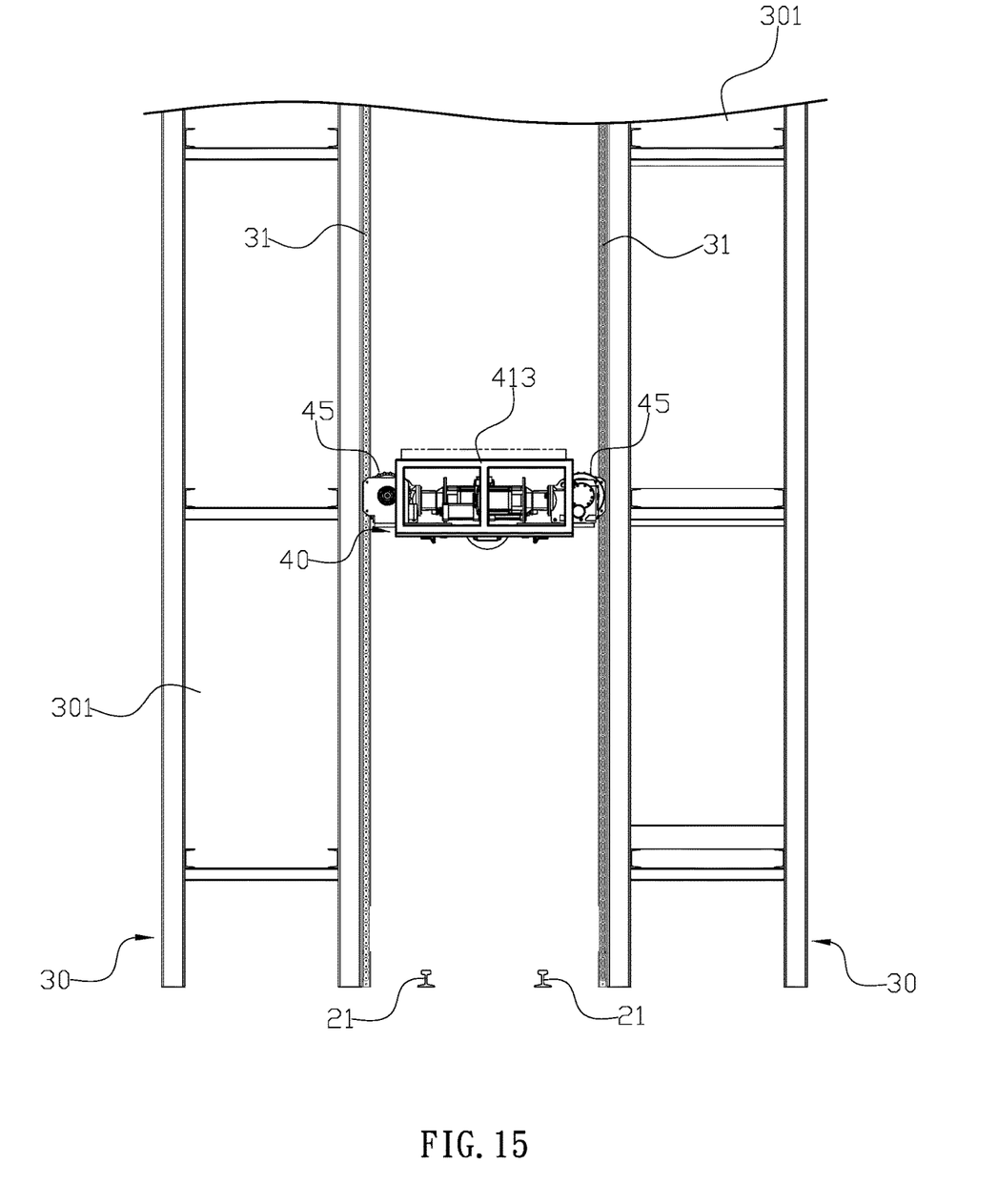
FIG. 15 is a schematic view illustrating the automated vehicle climbing to a predetermined height.

In actual application, before stored in the automated warehouse storage and retrieval system of the present invention, an article (50) to be warehoused is placed at a holding area which can be reached by the automated vehicle (40) through the rail (21), and the article (50) is adapted to be carried and placed by the automated vehicle (40) to a designated storage position (301) on the shelf (30). After picking the article (50) up, the automated vehicle (40) is configured to move along the rail (21) into the aisle (20) to reach a position aligned with a lower portion of the shelf (30) which is located right below the designated storage position (301). By this time, the automated vehicle (40) is located between the two shelves (30), and the climbing units (45) pushed out from the first openings (412) by the telescopic members (43) are configured to engage with the chains (313) on the shelves (30) respectively, and each of the auxiliary wheels (454) is adapted to pass through the gaps (315) into the interior space of the guiding track (311) (as shown in FIGS. 11 and 12). As a result, each of the power units (44) is adapted to drive and rotate the chain wheel (455) in a forward direction, and the rotating chain wheel (455) is configured to engage with the chain (313) so as to raise the automated vehicle (40) to a height of the designated storage position (301) (as shown in FIGS. 13 to 15). Thereafter, the retractable pick-and-place unit (42) is adapted to carry and place the article (50) to the designated storage position (301). Furthermore, when the automated vehicle (40) is moved upwardly, the auxiliary wheels (454) of the climbing units (45) are configured to contact to inner surfaces of the guiding tracks (311) of the supporting members (31) respectively, thereby preventing the automated vehicle (40) from slipping and falling down during raising process. After the article (50) is placed and the pick-and-place unit (42) is retracted, the climbing units (45) are adapted to rotate reversely and climb downwardly back to the rail (21), and the climbing units (45) are configured to be synchronously retracted back into the first openings (412) by the telescoping member (43) to detach from the supporting members (31) such that the automated vehicle (40) can move on the rail (21) again. Additionally, the automated vehicle (40) can also be used for moving the stored article (50) out of the warehouse of the present invention.

Since the automated vehicle (40) of the present invention has no upright post thereon, the single aisle (20) can be accessed by more than one automated vehicle (40) in the same time. In case that the present invention has two automated vehicles (40). When the two automated vehicle (40) meet on the rails (21) between the shelves (30), one of the automated vehicle (40) can move upwardly through the climbing units (45) thereof to climb along the adjacent supporting members (31) of the shelves (30) to a preferable height, thereby enabling the other automated vehicle (40) to pass through toward a designated position. Moreover, since the automated vehicle (40) works between the shelves (30), through the pick-and-place unit (42) thereof, the automated vehicle (40) can directly and horizontally move the stored article (50) from one shelf (30) to another, thereby saving time and energy.

In one embodiment, the automated warehouse storage and retrieval system comprises a plurality of aisles (20) which are connected, and the automated vehicle (40) is configured to travel between the aisles (20).

In another embodiment, each of the shelves (30) has a plurality of storage positions (301) arranged in a checkerboard pattern, and the vertical supporting members (31) are arranged at positions misaligned with the storage positions (301).

In still another embodiment, each pair of figure-eight-shaped metal plates (316) respectively coupled on two outer surfaces of the guiding track (311) is connected to secure the chain link (314) in the guiding track (311), and the metal plates (316) are adapted to prevent the guiding track (311) from deformation when the automated vehicle (40) is working, wherein each pair of metal plates (316) is connected through bolts and U-shaped clamps.

Figure 6:
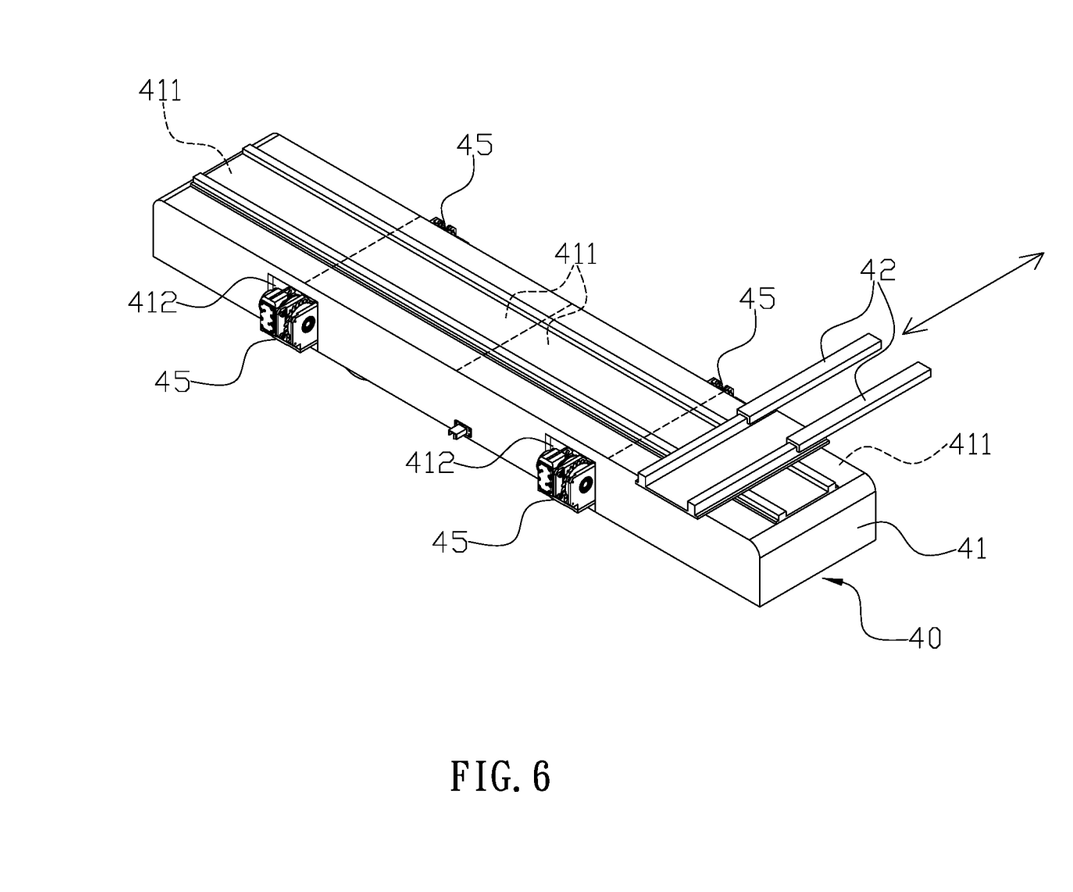
FIG. 6 is a schematic view illustrating a pick-and-place unit of the automated vehicle protrudes from a lateral side of the automated vehicle in the present invention.
Figure 7:
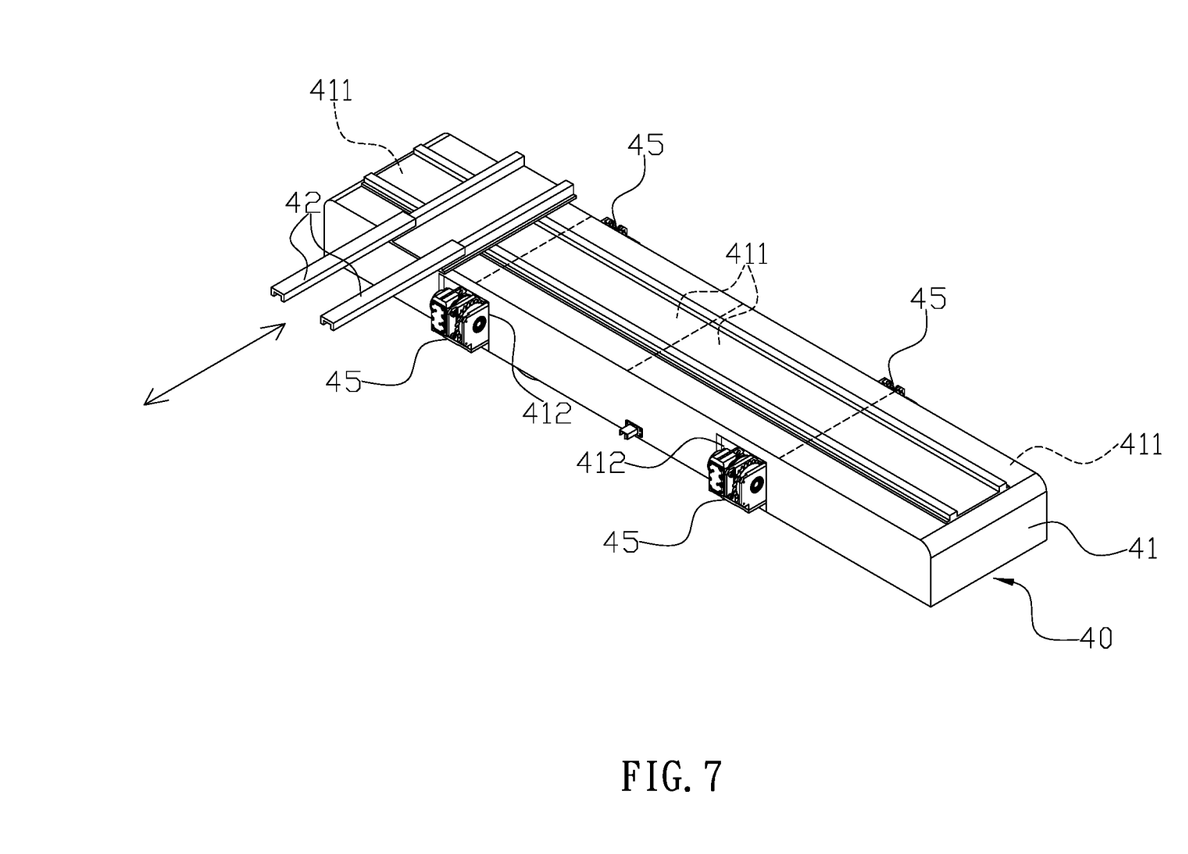
FIG. 7 is a schematic view illustrating the pick-and-place unit slides on a platform of the automated vehicle and protrudes from another lateral side of the automated vehicle of the present invention.
Figure 8:
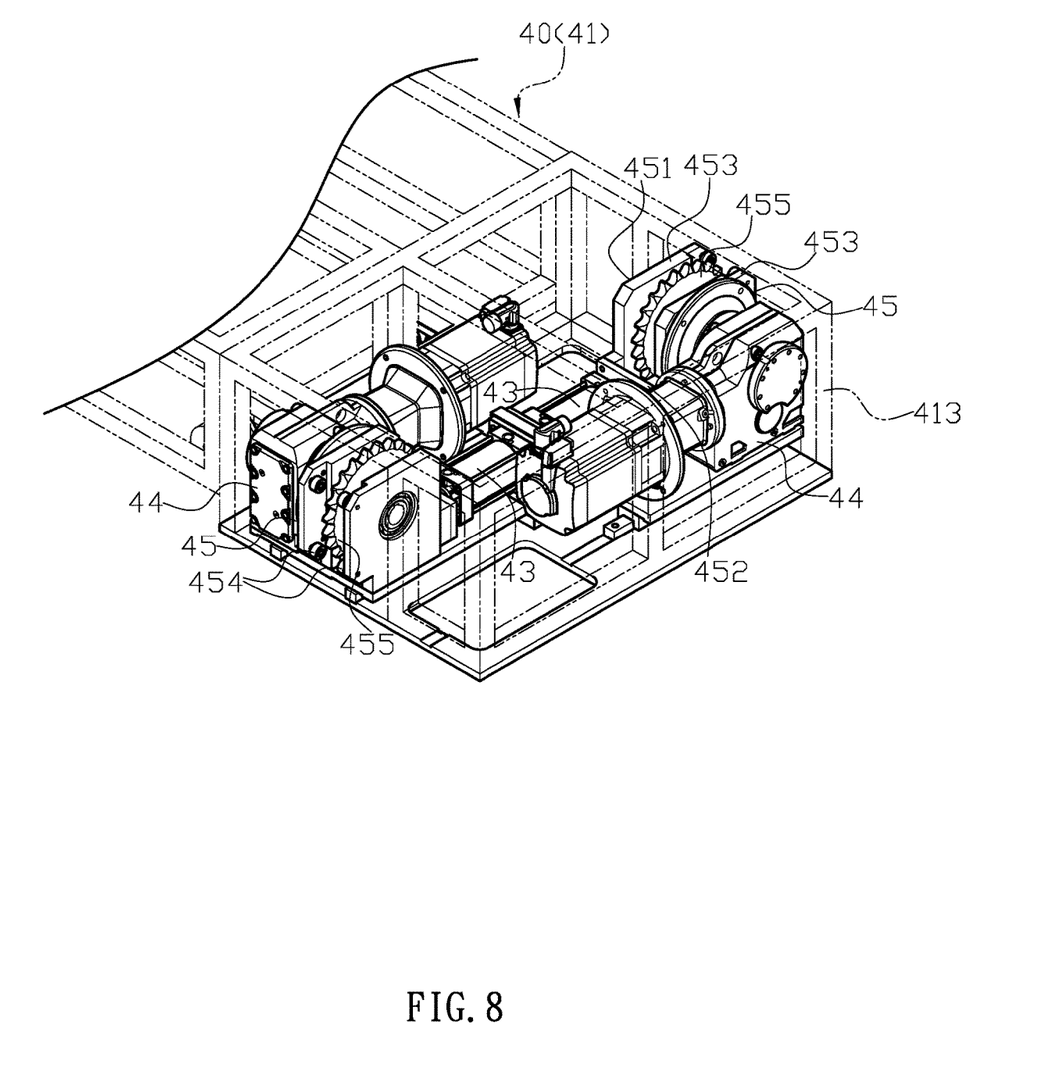
FIG. 8 is an internal structure diagram of the automated vehicle of the present invention.
Figure 9:
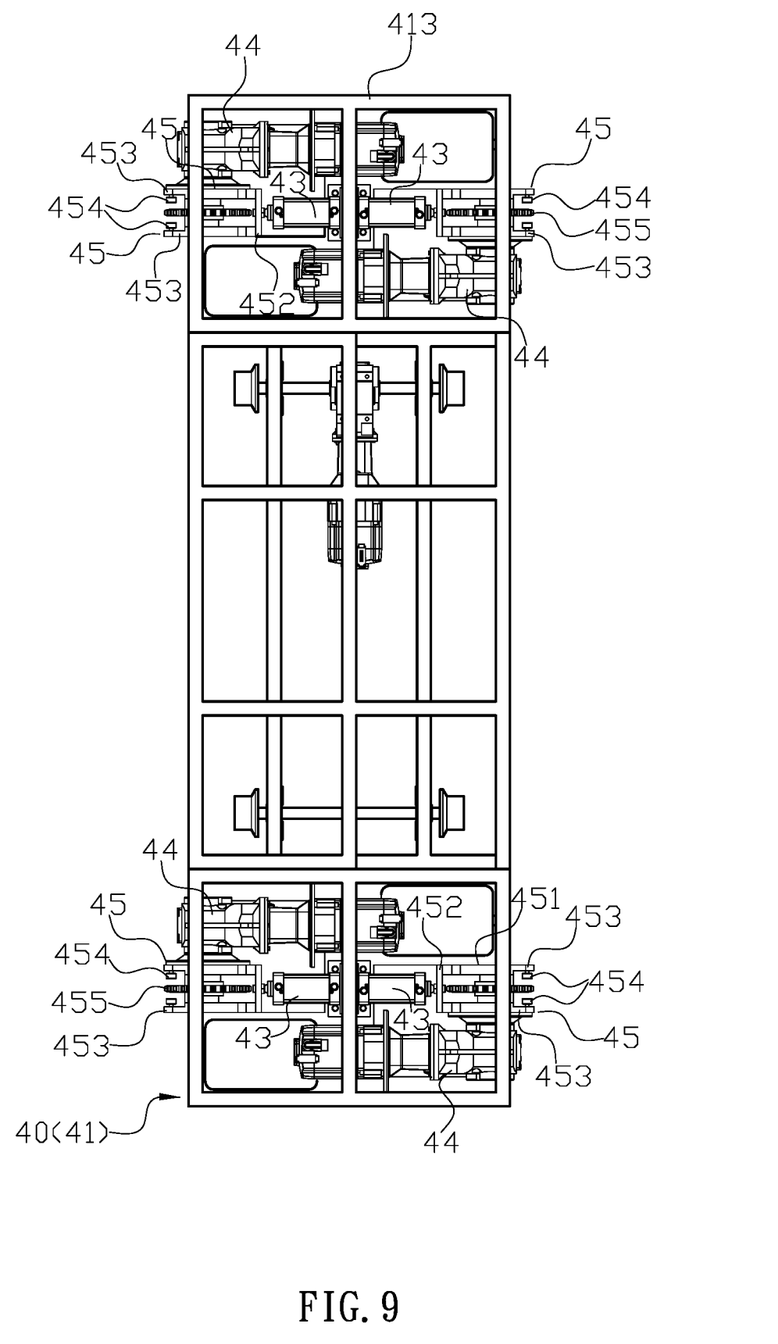
FIG. 9 is a plane view of FIG. 8.
Figure 10:
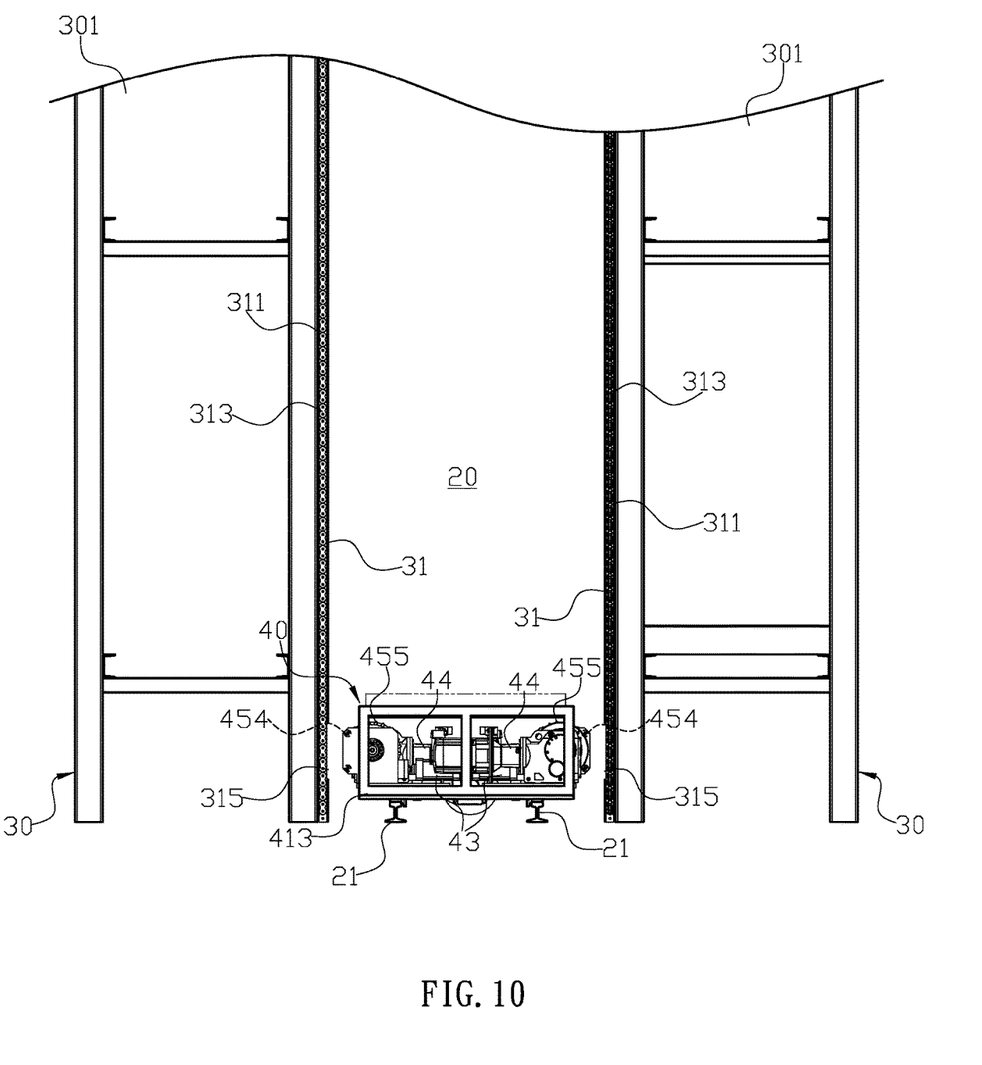
FIG. 10 is a plane view illustrating the automated vehicle moves on an aisle of the present invention.

In a further embodiment, the platform (41) of the automated vehicle (40) has one pick-and-place unit (42) and four working stations (411) thereon, and the pick-and-place unit (42) is configured to slide on the platform (41) and stay on any of the working stations (411) which is favorable to pick the article (50) placed on the storage positions (31) of the shelf (30) or to place the article (50) to the designated storage position (31) of the shelf (30) (as shown in FIGS. 6 and 7).

Figure 16:
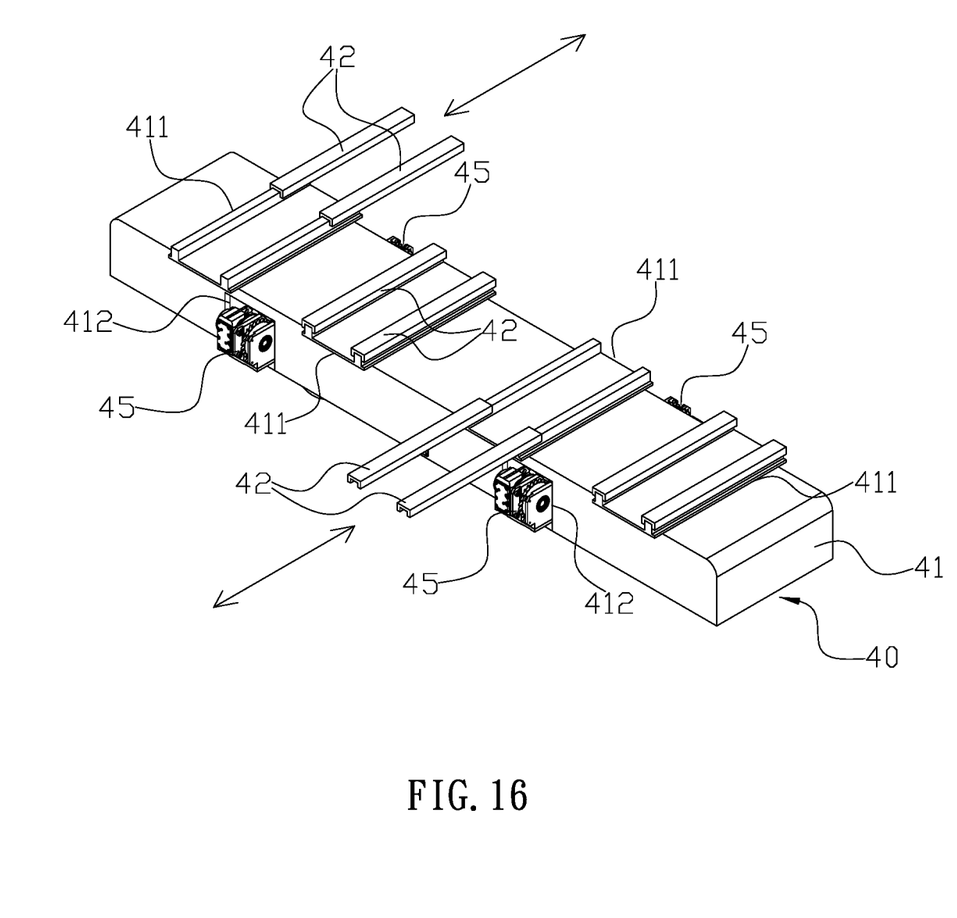
FIG. 16 illustrates another embodiment of the automated vehicle in the present invention.

In still a further embodiment, the platform (41) has four working stations (411), and each of the working stations (411) has one pick-and-place unit (42) thereon (as shown in FIG. 16).

In yet a further embodiment, the pick-and-place unit (42) is a pair of pallet forks which is adapted to retractably protrude from a lateral side of the platform (41) (as shown in FIGS. 6, 7 and 16).

In a particular embodiment, the platform (41) comprises a supporting frame (413) formed therein to accommodate the telescopic members (43), the power units (44), and the climbing units (45), and each of the telescopic members (43) is secured on the supporting frame (413).

In a preferred embodiment, each of the telescopic members (43) is a hydraulic cylinder.

In an advantageous embodiment, each of the power units (44) is an electric motor.

Comparing with conventional automated warehouse storage and retrieval system, the present invention is advantageous because: (i) the present invention enables a plurality of automated vehicles (40) to work at the same aisle (20), which improves the efficiency of warehouse works; (ii) without the upright post, the volume and weight of the automated vehicle (40) are reduced, which enables the automated vehicle (40) to work more efficiently thereby saving more energy; and (iii) the supporting members (31) can be manufactured separately and be connected thereafter, which lowers the cost and is easy for maintenance.

Having described the invention by the description and illustrations above, it should be understood that these are exemplary of the invention and are not to be considered as limiting. Accordingly, the invention is not to be considered as limited by the foregoing description, but includes any equivalents.

What is claimed is:
1. An automated warehouse storage and retrieval system comprising:
   at least an aisle, and each of two sides of the aisle having a shelf, and a rail laid along the aisle to enable at least an automated vehicle to move thereon;
   the automated vehicle having a platform, and a top surface of the platform comprising at least a working station and at least a pick-and-place unit thereon;
   each of two lateral sides of the platform having two first openings which are separated by a desired distance, and each of the first openings comprising a climbing unit installed therein;
   each of the climbing units configured to be operated by a telescoping member to synchronously protrude from or move back in the first opening, and each of the climbing units driven by a power unit to have forward or reverse rotation; a side of the shelf, which is faced to the rail, having a plurality of vertical supporting members arranged in parallel, and each two adjacent supporting members separated by the distance same as the two climbing units on the same lateral side of the platform;

the automated vehicle configured to move on the rail to a designated position, and the climbing units pushed out from the first openings by the telescoping members so as to respectively engage with the supporting members of the shelves at the two sides of the aisle;

the climbing units configured to upwardly or downwardly climb along the supporting members synchronously thereby raising the automated vehicle to a designated height or lowering the automated vehicle back to the rail;

wherein each of the supporting members of the shelf has two vertical elongated guiding tracks, and each of the guiding tracks comprises an interior space and a vertical elongated opening to form the cross-section of the guiding track in a U-shape, and the two vertical elongated openings on the two guiding tracks are faced toward opposite directions; the two guiding tracks of the supporting member are separated by a designed distance, and a vertical lift groove is formed therebetween; each of the two guiding tracks has a plurality of chain links secured thereon to form a linear chain in the lift groove, and each of the guiding tracks has a gap at a lower portion; and wherein each of the climbing units has a base, and the base comprises a backboard and two side boards; each of the two side boards has an auxiliary wheel pivotally installed on an inner surface of the side board, and a chain wheel is installed between the two side boards; each of the power units installed on either of the two side boards of the base of the climbing unit is connected to and drive the chain wheel; each of the telescopic members is connected to the backboard of the climbing units such that each of the climbing units together with the power unit is adapted to be pushed out from or retracted back in the platform of the automated vehicle by the telescopic member.

2. The automated warehouse storage and retrieval system of claim 1, wherein the automated warehouse storage and retrieval system comprises a plurality of aisles which are connected, and the automated vehicle is configured to travel between the aisles.

3. The automated warehouse storage and retrieval system of claim 1, wherein each of the shelves has a plurality of storage positions arranged in a checkerboard pattern, and the vertical supporting members are arranged at positions misaligned with the storage positions.

4. The automated warehouse storage and retrieval system of claim 1, wherein each pair of figure-eight-shaped metal plates respectively coupled on two outer surfaces of the guiding track is connected to secure the chain link in the guiding track.

5. The automated warehouse storage and retrieval system of claim 1, wherein the platform of the automated vehicle has one pick-and-place unit and four working stations thereon, and the pick-and-place unit is configured to slide on the platform and stay on any of the working stations which is favorable to pick the article placed on the storage position of the shelf or to place the article to the designated storage position of the shelf.

6. The automated warehouse storage and retrieval system of claim 1, wherein the platform has four working stations, and each of the working stations has one pick-and-place unit thereon.

7. The automated warehouse storage and retrieval system of claim 1, wherein the pick-and-place unit is a pair of pallet forks which is adapted to retractably protrude from a lateral side of the platform.

8. The automated warehouse storage and retrieval system of claim 1, wherein the platform comprises a supporting frame formed therein to accommodate the telescopic members, the power units, and the climbing units, and each of the telescopic members is secured on the supporting frame.

9. The automated warehouse storage and retrieval system of claim 1, wherein each of the telescopic members is a hydraulic cylinder.

10. The automated warehouse storage and retrieval system of claim 1, wherein each of the power units is an electric motor.

* * * * *